(No Model.)
O. H. P. BROWN.
PEACH PITTER.
No. 317,966. Patented May 19, 1885.
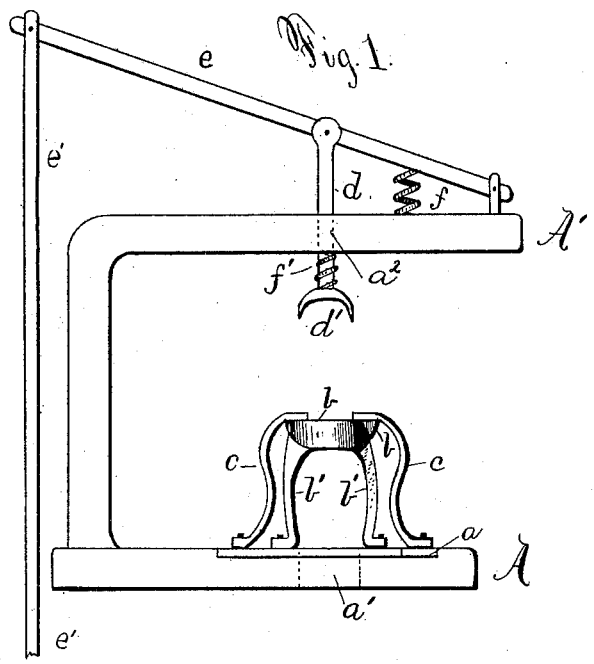
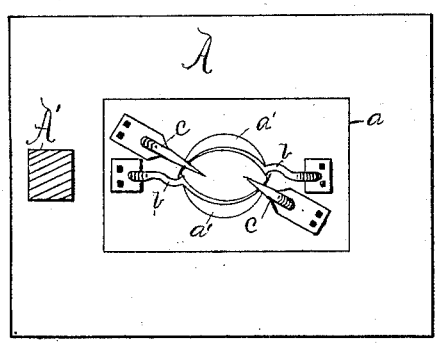
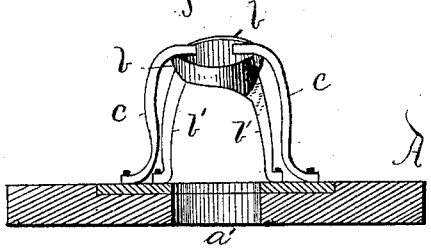
Witnesses.
J. Charleton Ingram.
H. Bickford
Inventor.
Oliver H. P. Brown
By John S. Duffie
his Attorney

UNITED STATES PATENT OFFICE.

OLIVER H. P. BROWN, OF CLARKSVILLE, ARKANSAS.

PEACH-PITTER.

SPECIFICATION forming part of Letters Patent No. 317,966, dated May 19, 1885.

Application filed October 4, 1884. (No model.)

*To all whom it may concern:*

Be it known that I, OLIVER H. P. BROWN, a citizen of the United States, residing at Clarksville, in the county of Johnson and State of Arkansas, have invented certain new and useful Improvements in Peach-Pitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to peach-pitters; and it consists in the novel construction and arrangement of its parts.

Figure 1 is a side elevation of the same. Fig. 2 is a top view of the knives. Fig. 3 is a side elevation of the knives, slightly perspective, however, to show the curve of the peeling-knives.

My invention is described as follows:

On the upper face of the base A, I secure a plate, $a$.

Through the base A and plate $a$, I make a pit-hole, $a'$, for the peach-seed to fall through into the receptacle placed beneath for that purpose.

On the upper face of the plate $a$, I mount two stripping-knives, $b\ b$, which are curved in such a manner as to encompass an ordinary peach-seed. The handles $b'\ b'$ of these knives are flat and elastic, and allow the knives $b\ b$ to spring open as the belly of the seed passes between them, and bring them together again as they near the small end of the seed, thus causing them to closely hug the seed its entire length and perfectly clean all the meat from the same.

On the base-plate $a$, I secure two other knives—splitting-knives—$c\ c$, the blades of which extend over the edge of the knives $b\ b$, and overhang the opening between the edge of the same, and split the meat of the peach down to the seed thereof.

From the upper face of the beam A, I extend an arm, A', which overhangs the knives mentioned above.

Through the perforation $a^2$ extends a rod, $d$, to the lower end of which are attached the fingers $d'$, for holding the peach in place and thrusting it through the said knives. This rod $d$ is operated by a lever, $e$, and a treadle-shaft, $e'$. The lever $e$, after it has made its downstroke, is thrown up again by a spiral spring, $f$, while the spiral spring $f'$ regulates the distance of its upward stroke, and keeps the said fingers from being brought up with a slam against the lower face of the arm A', and eventually knocked off.

What I claim as new, and desire to secure by Letters Patent, is—

1. In a peach-pitter, as above described, the combination of base A, having on its upper face plate $a$, both having pit-hole $a'$, curved stripping-knives $b\ b$, mounted on elastic handles $b'\ b'$, and splitting-knives $c\ c$, substantially as shown and described, and for the purposes set forth.

2. In a peach-pitter, the combination of base A, having on its upper face plate $a$, both having pit-hole $a'$, splitting-knives $c$, stripping-knives $b$, lever $e$, working on arm A', rod $d$, bearing fingers $d'$, and spiral springs $f$ and $f'$, substantially as shown and described, and for the purposes set forth.

In testimony whereof I affix my signature in presence of two witnesses.

OLIVER H. P. BROWN.

Witnesses:
A. S. McKENNON,
F. R. McKENNON.